Oct. 11, 1949.  O. E. ESVAL  2,484,022
PICKOFF DEVICE FOR ELECTRICAL CONTROL SYSTEMS
Filed March 27, 1945  2 Sheets-Sheet 1
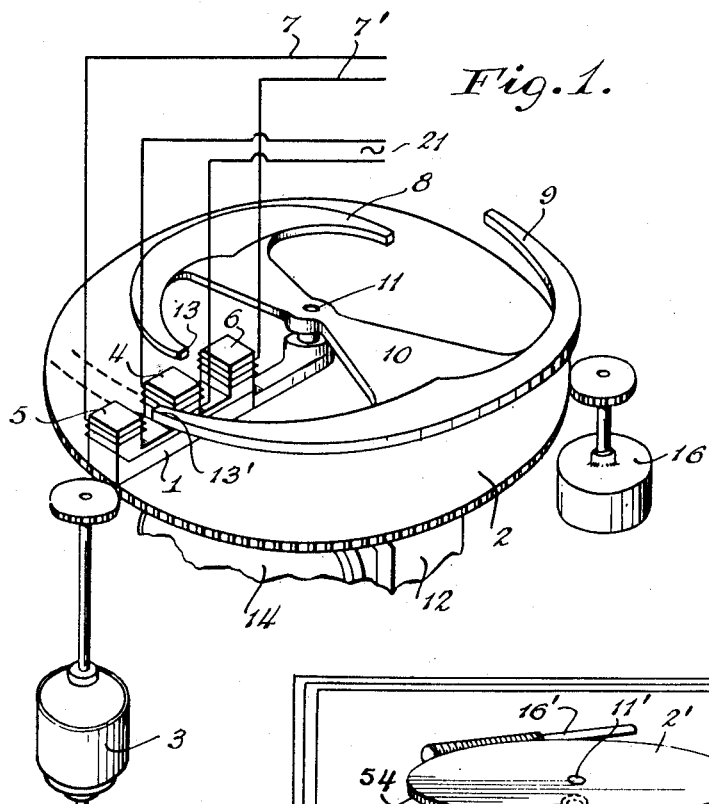
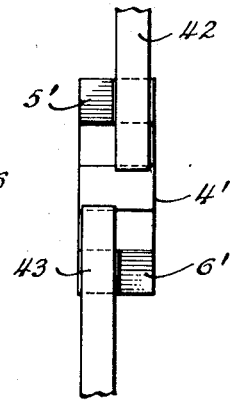
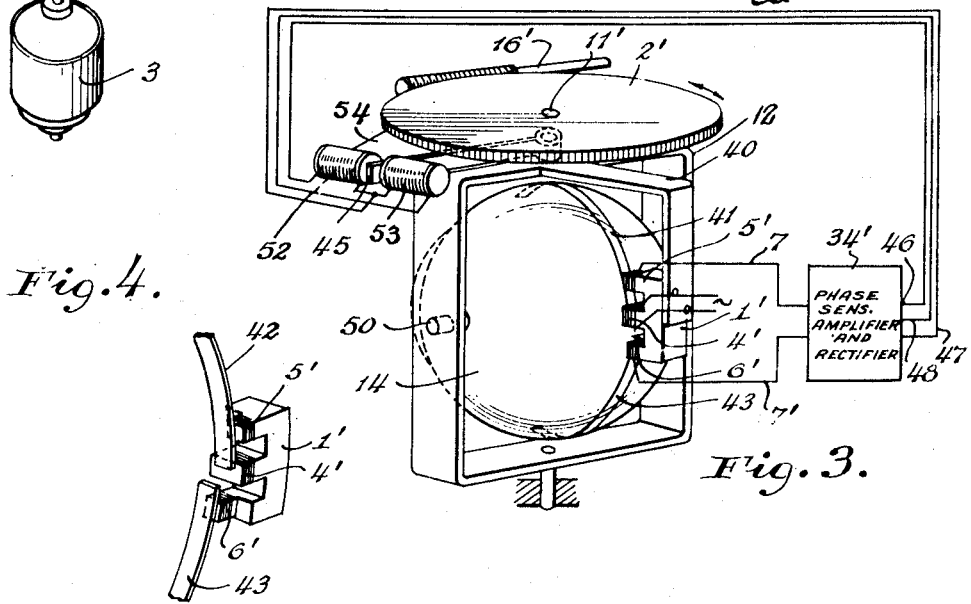
INVENTOR
O. E. ESVAL
BY Herbert H. Thompson
his ATTORNEY.

Oct. 11, 1949.　　　　　O. E. ESVAL　　　　　2,484,022
PICKOFF DEVICE FOR ELECTRICAL CONTROL SYSTEMS
Filed March 27, 1945　　　　　　　　　　2 Sheets-Sheet 2

INVENTOR
O. E. ESVAL
BY Herbert H. Thompson
his ATTORNEY.

Patented Oct. 11, 1949

2,484,022

UNITED STATES PATENT OFFICE 2,484,022

PICK-OFF DEVICE FOR ELECTRICAL CONTROL SYSTEMS

Orland E. Esval, Huntington, N. Y., assignor to The Sperry Corporation, Great Neck, N. Y., a corporation of Delaware Application March 27, 1945, Serial No. 585,087

10 Claims. (Cl. 177—380)

This application is a continuation-in-part of copending application Serial No. 448,794, filed June 22, 1942, for Electrical control systems, now Patent No. 2,462,095 issued February 22, 1949, which in turn is a division of abandoned application Serial No. 407,460, for Electrical control systems, filed August 19, 1941.

This invention relates to position control systems, for remotely controlling and accurately positioning objects such as searchlights and guns, from an accurately positioned or position-maintaining instrument. By this invention one may also control the steering of a dirigible vehicle, such as ship or airplane, by positioning the rudder or other control surface. The invention also has application to straight follow-up systems wherein the position of a follow-up element is accurately maintained with reference to a rotatable control or sensitive element such as a gyro compass or directional gyro.

For this purpose, I provide a novel pick-off device for producing an electrical signal in response to displacement of the control or sensitive element which reverses phase upon reversal of the displacement. In former pick-off devices of this type, for example that shown in Patent No. 1,959,804, to Wittkuhns et al., issued May 22, 1934, for Non-contacting follow-up system, a useful signal is secured only through a comparatively small angle of deflection of the control element, say 10 degrees or less. I overcome this limitation of the prior art and provide a kick-off means in which a positive signal is generated for angular deviations approaching 180 degrees. In addition, I may provide a pick-off device in which the signal output continuously increases as the deviation increases, rather than one which quickly reaches a maximum constant signal, as is the case in the above-mentioned patent.

It has been recognized that the generation of a simple reversible signal is not sufficient for control purposes even where such signal is proportional to the relative displacement between the position-maintaining device and the controlled device. For obtaining accurate control, I propose to generate an electrical signal which not only varies in phase and magnitude with the direction and amount of relative displacement between the control and controlled device but which also varies with the relative velocity and preferably also a higher time derivative of the relative displacement. This is done by operating electrically in the improved rate amplifier shown in application Serial No. 448,794 upon the signal obtained from my improved pick-off means, described and claimed herein, so as to add to this signal certain components representing the velocity and acceleration of the displacement of the controlling object. With this improved system, it is possible to maintain the relative displacement between two objects at practically zero, or to control the position of a remote object with very high accuracy.

Specifically, I employ a Ward-Leonard type of control using a motor-generator set, the generator having two opposed field windings. The A.-C. reversible phase control signal obtained from our improved pick-off means is amplified and modified by the addition of velocity and acceleration components in the improved rate amplifier of application Serial No. 448,794, whose output includes two direct currents which excite the opposed generator field windings to produce one or the other direction of control of the controlled object, in accordance with the phase of the pick-off signal. The controlled object may be a follow-up motor or a servomotor.

Referring to the drawings,

Fig. 1 is a perspective view of the pick-off or signal generating portion for a positional control device, such as used with a directional gyro or a gyro compass;

Fig. 3 is a perspective view of a directional gyro with automatic leveling device including torque coils and a pick-off with its armature mounted on a directional gyro casing at right angles to the spin axis; and Figs. 4 and 5 are details of the cooperative arrangement of the armature and pick-off transformer of Fig. 3.

Figure 2:
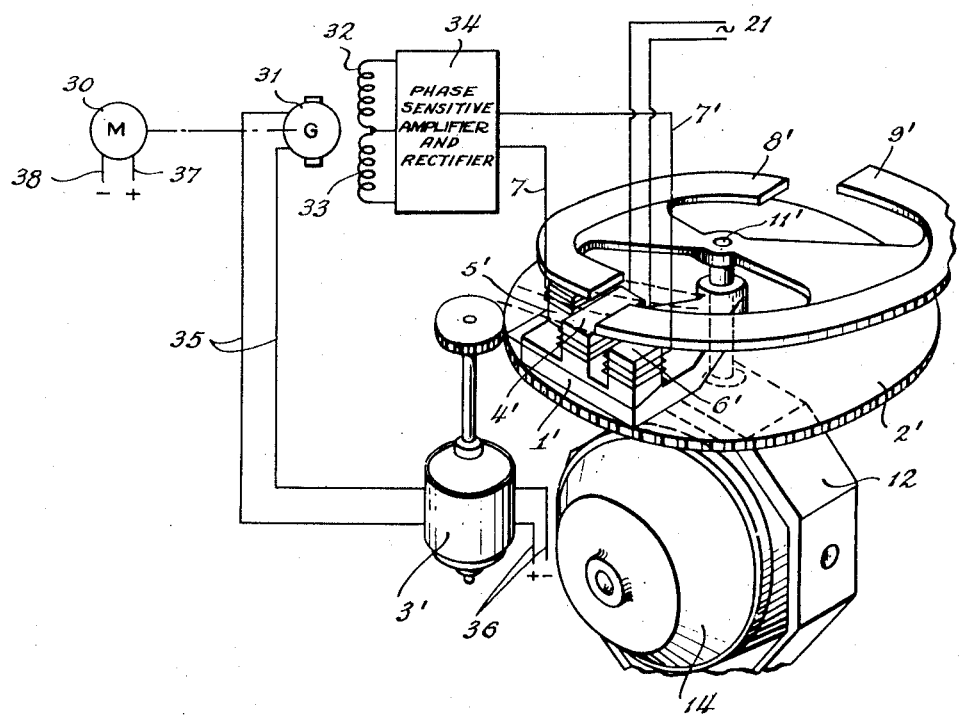
Fig. 2 is a similar view of a slightly modified form of signal generator.

The pick-off means or signal generator is shown in Fig. 1 as a variable inductive device comprising a three-legged transformer 1 mounted on a gear follow-up platform 2 which may be rotated from the follow-up motor 3. The center leg 4 of the transformer is shown as continuously excited from a single phase A.-C. source 21 while the two outer legs 5 and 6 are connected in opposition so that their output through lines 7—7' is zero when the transformer is balanced, but is of one phase as the induced current in one leg predominates and of the other phase as the induced current predominates in the other leg. As shown, the transformer 1 is mounted on platform 2, with the legs 4, 5 and 6 in radial alignment with stem or axis 11. Cooperating with said transformer is shown a pair of soft iron armatures 8 and 9 which may be of nearly semi-circular form, each mounted on a common non-magnetic base 10 secured to vertical stem 11 rising from the vertical ring 12 of a gyroscope 14 through an aperture in platform or gear 2 and the support for transformer 1, so that said armatures are coplanar and fixedly oriented in azimuth from the gyroscope 14. The armature 8 is shown as of less diameter than armature 9 so that it passes between and above poles 4 and 6 while the armature 9 passes between and above poles 4 and 5. In the normal balanced condition, the two ends 13 and 13' of the armatures lie about on a line with the two outer edges of the poles 4, 5 and 6, in which position there is no net output from the signal generator through lines 7—7', since the voltages induced in legs 5 and 6 then balance one another. Preferably each pole piece is tapered, gradually increasing in cross-sectional area as it recedes from the tips 13 and 13'. By this means, a signal which increases with angular displacement is secured through a fairly large displacement angle, as opposed to the prior art as indicated by the above cited patent. This form of inductive pick-off also has the advantage that control is not lost except when the angular displacement approaches 90° either side of the balanced position, thus maintaining full control over 180 degrees of arc.

The output from this pick-off device, which is the voltage appearing across terminals 7—7', may be amplified in a rate amplifier which introduces velocity and acceleration components into the control signal, which then may control motor 3 to drive follow-up platform 2 and transformer 1 into correspondence with armatures 8, 9, the system then acting as a follow-up system. The position of platform 2, which is thereby kept synchronized with that of base 10 and hence with gyroscope 14, may be transmitted to a remote point as by Selsyn transmitter 16 to give a suitable remote indication.

Alternatively, the output of the rate amplifier may control any suitable remote motor, to remotely control any suitable object. The system may thereby act as an automatic pilot, turning a craft until the orientation of platform 2, which would then be fixed to the craft, corresponds with that of gyroscope 14. The craft then acts as the follow-up element of the system.

It will be obvious that the mountings of transformer 1 and armatures 8, 9 may be interchanged; that is, the transformer may be mounted on the gyro vertical ring 12, and the armatures on the platform 2.

Also, armatures 8, 9 instead of tapering from both ends to the center, might taper continuously from one end to the other. This would give full 360 degrees of control with continuously increasing signal.

In the form of invention shown in Fig. 2 the inductive transformer 1' is similar to that of Fig. 1 except that the three poles in this instance are arranged circumferentially instead of radially as in Fig. 1. In this case, the center pole 4' is of greater width than the outer poles 5' and 6' and the gyro stabilized armatures 8' and 9' are shown as coplanar and of uniform width. With this construction, armature 8' effectively cooperates only with poles 4' and 5', while armature 9' cooperates only with poles 4' and 6'.

With this type of pick-off, a sharp increase in signal output is obtained for small displacements of armatures 8', 9' relative to transformer 1', but the signal does not vary with displacement over a wide angle, as is the case with the device of Fig. 1. However, full control is maintained over the entire 360 degrees of rotation.

In the showing of Fig. 2, the control of follow-up motor 3' is effected by a Ward-Leonard type of control used in the motor-generator set comprising a motor 30 and generator 31 and opposed field windings 32, 33 powered from amplifier 34. The A.-C. reversible phase control signal from the pick-off 1' is fed into the amplifier through lines 7—7', and, according to the phase input in the amplifier, the generator 31 will feed a reversible current through line 35 to the follow-up motor. This latter has its field energized by direct-current fed through lines 36 while the motor 30 of the motor-generator set is driven by direct-current fed through lines 37, 38.

In the form shown in Figs. 3, 4 and 5, the novel transformer 1' is made use of to prevent tilt of the gyro rotor spin axis and its casing 14 about its horizontal axis and act as a leveling device for directional gyroscopes. In this construction, the transformer unit 1' is provided with a central leg 4' and end legs 5', 6', all as shown in the structure of Fig. 2. This unit is mounted on a bracket 40 which may be secured to the vertical ring 12 in which the rotor casing 14 is horizontally pivoted on axis 50. On the rotor casing 14 proper, an armature strip 41, concentric with axis 50, is secured in any suitable manner. The armature 41 comprises curved strips of magnetic material having parallel end sections 42, 43, offset with respect to each other. The armature strips preferably extend over half the vertical periphery of the rotor casing 14 and the top strip 42 is in alignment with pole piece 5' of the transformer, while the bottom section or strip 43 is adapted to coact with pole piece 6'. In the neutral or zero operating position, the pole pieces 5' and 6' will have magnetic circuits completed by armature sections 42 and 43, respectively. Because of its mounting, the armature 41, or armature sections 42, 43 are severally concentric with axis 50, as are the cooperating pole faces of transformer legs 4', 5' and 6', conformed with the armature sections. The poles 5' and 6' will supply no current to the leads 7—7' because of the opposed windings thereon. When casing 14 tends to tilt about its horizontal axis, the transformer unit 1' restores it to neutral in the following manner.

The current leads 7—7' from the windings on legs 5', 6', are connected to the coils of torque magnets 52, 53, mounted on a lug or shelf 54 secured to follow-up platform or gear 2' which is driven by worm shaft 16' from a follow-up motor (not shown). An armature 45 is disposed between the pole faces of coils 52, 53, and is fixedly secured to the trunnion 11' of the vertical ring 12. Thus, when rotor casing 14 tilts about its horizontal axis, a differential current is set up in the coils on poles 5' and 6', which current energizes leads 7—7', and is controlled in direction or phase by the magnetic circuits set up between poles 4', 5' or 4', 8'. The current developed is passed through the phase sensitive amplifier and rectifier 34' and leads 46, 47 and 48, and will differentially energize either coil 52 or 53 of the torque magnets and thereby apply pressure to the armature 45. This pressure will be applied through trunnion 11' to the gimbal or frame member 12, tending to cause it to precess about its horizontal axis to eliminate the tilt.

By securing the armature strip 41 to the motor casing 14, the improvements of the present invention can be applied to standard gyroscope equipment without increasing the dimensions of the encased structures. This is particularly desirable in the rotor housing or casing where all parts are machined and held to very close tolerances. The particular transformer structure, including the offset outer pole faces and the conformed armature sections, insures a large initial signal upon the first slight movement away from the level position which quickly reaches a maximum for all tilts. This insures maximum efficiency in operation at the time of incipient or initial wandering or tilts away from the predetermined operative position. The inclusion of the torque magnets in the system permits the use of light-weight constructions to effect a maximum of efficient operation without adding to the weight of the gyro assembly.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A pick-off device for generating a signal in response to relative displacement between two relatively rotatable objects comprising a transformer including a three legged core having two separate open magnetic circuits and mounted to one of said objects, an output coil linking each of said circuits, means for supplying an alternating magnetomotive force to each of said circuits, a pair of magnetic armature members mounted on the other of said objects to form a device in which the ends of each member are offset from the ends of the other in such manner that each member cooperates with one of the gaps of said circuits in a differential manner with respect to the other member, and means for connecting said coils in opposition, whereby an output voltage having a phase sensitive to the sense of said relative displacement is obtained.

2. A device as in claim 1 in which said transformer comprises a three-legged core mounted circumferentially with respect to the rotational axis of said one object, in which said armature members comprise arcuate arms mounted on said second object concentrically with respect to said axis, and in which the outer legs of said transformer are shaped so as to each cooperate with only one of said members.

3. A device as in claim 1, wherein said armature members comprise concentric arcuate arms tapered in opposite directions and said transformer includes a three-legged core, each of said arms partially completing the magnetic circuit between the center and one outside leg of said three legs.

4. A pick-off device for generating a signal in response to relative displacement between two objects, comprising a transformer having three legs, a coil wound about each leg, means for energizing the coil on one leg with A.-C., means connecting said other coils to form an output circuit, means for maintaining said transformer on one of said objects, a pair of arcuate magnetic armatures mounted on the other of said objects to form a substantially circular device in which the ends of each member are offset from the ends of the other in such manner that one armature partially completes the air gap for flux passing between said energized leg and one of said other two legs, and said other armature partially completes the air gap for flux passing between said energized leg and the other of said other two legs, whereby relative displacement between said two objects will change said air gaps and therefore the voltage induced in each of said other windings.

5. A device as in claim 4 in which said transformer has the outer legs offset with respect to each other along a diagonal line including the center leg, and the center leg forms common magnetic circuits with both outer legs.

6. A device as in claim 4 in which the transformer core has a center leg and two end legs offset with respect to each other along a diagonal line joining the center leg.

7. A signal generator for an automatic positional control device comprising a transformer having three legs with two of the said legs offset with respect to each other along a diagonal line through the center leg, a coil wound about each leg, means for energizing the coil of one leg with alternating current, means for connecting said other coils on the diagonal legs to form an output circuit, means for maintaining said transformer on a device to be positioned, a pair of arcuate magnetic armatures, means for supporting said armature assembly on the other of said devices in such manner that one armature completes the air gap for flux passing between said energized leg and one of said other two legs, and said other armature completes the air gap for flux passing between said energized leg and said other two legs, whereby said relative displacement will initially change said air gaps differentially and therefore the voltage in each of the other of said windings.

8. A pick-off device for generating a signal in response to relative displacement between two objects, comprising a transformer having three legs, a coil wound about each leg, means for energizing the coil one one leg with A. C., means connecting said other coils to form an output circuit, means for maintaining said transformer on one of said objects, a pair of arcuate magnetic armatures, means rotatable through 180° of arc for supporting said armatures on the other of said objects to form a substantially circular device in which the ends of each member are offset from the ends of the other in such manner that one armature partially completes the air gap for flux passing between said energized leg and one of said other two legs, and said other armature partially completes the air gap for flux passing between said energized leg and the other of said other two legs, whereby relative displacement between said two objects will change said air gaps and therefore the voltage induced in each of said other windings.

9. An inductive pick-off comprising a three-legged core with a coil wound about each leg, one of said coils serving as an input and the other coils serving as opposing outputs, and tapered armatures movable in magnetic circuit-closing relation with respect to the legs of said core, whereby a linear signal is produced through a wide angle of relative displacement between said core and its armatures.

10. A pick-off device for generating a signal in response to relative displacement between two relatively rotatable objects comprising a transformer mounted on one of said objects and having two separate open magnetic circuits, an output coil linking each of said circuits, means for supplying an alternating M. M. F. to each of said circuits, a pair of semicircular magnetic armature members, common rotating means for mounting said members on the other of said objects in such manner that each member cooperates with one of the gaps of said circuits in a differential manner with respect to the other member, and means for connecting said coils in opposition, whereby an output voltage having a phase sensitive to the sense of said relative displacement is obtained, said transformer including a three-legged core mounted radially with respect to the axis of rotation of said one object, and said armature members comprise arcuate arms, one arm cooperating with the gap between the center leg and one outside leg of said transformer, and the other arm cooperating with the center leg of the other outside leg, both said arms being tapered so as to give a straight line M. M. F. when severally cooperating with said transformer gaps, said armature assembly being rotatable through 360°.

ORLAND E. ESVAL.

REFERENCES CITED

The following references are of record in the file of this patent:

UNITED STATES PATENTS

| Number | Name | Date |
|---|---|---|
| 705,482 | Theirmann | July 22, 1902 |
| 1,128,008 | Kramer et al. | Feb. 9, 1915 |
| 1,431,627 | Bristol et al. | Oct. 10, 1922 |
| 1,921,983 | Wittkuhns | Aug. 8, 1933 |
| 2,052,385 | Dallmann | Aug. 25, 1936 |
| 2,240,184 | Hathaway | Apr. 29, 1941 |
| 2,268,956 | Mestus | Jan. 6, 1942 |
| 2,365,593 | Rights et al. | Dec. 19, 1944 |
| 2,380,251 | Ludbrook | July 10, 1945 |

FOREIGN PATENTS

| Number | Country | Date |
|---|---|---|
| 555,042 | Germany | July 19, 1932 |
| 643,684 | Germany | Apr. 14, 1937 |

Certificate of Correction

Patent No. 2,484,022                                                October 11, 1949

ORLAND E. ESVAL

It is hereby certified that errors appear in the printed specification of the above numbered patent requiring correction as follows:

Column 1, line 3, for "June 22, 1942" read *June 27, 1942*; column 6, line 43, for the word "one", first occurrence, read *on*;

and that the said Letters Patent should be read with these corrections therein that the same may conform to the record of the case in the Patent Office.

Signed and sealed this 2nd day of May, A. D. 1950.

[SEAL]

THOMAS F. MURPHY,
*Assistant Commissioner of Patents.*